United States Patent
Suhett De Souza et al.

(10) Patent No.: US 12,447,441 B2
(45) Date of Patent: Oct. 21, 2025

(54) PROCESS FOR OBTAINING POLYAMIDE MEMBRANE WITH NANOSTRUCTURED COATING, MEMBRANES AND USE

(71) Applicants: Petróleo Brasileiro S.A.—Petrobras, Rio de Janeiro (BR); Universidade Federal De Minas Gerais—UFMG, Belo Horizonte (BR)

(72) Inventors: Rodrigo Suhett De Souza, Ilha do Fundão (BR); Ricardo De Araujo Cid Da Silva, Ilha do Fundão (BR); Yara Luiza Brasil Zanon, Pampulha (BR); Vinícius Gomide De Castro, Pampulha (BR); Miriam Cristina Santos Amaral Moravia, Pampulha (BR); Glaura Goulart Silva, Pampulha (BR); Bruna Caroline De Jesus Ribeiro, Pampulha (BR); Ana Luiza Silvestre Assis, Pampulha (BR)

(73) Assignees: Petróleo Brasileiro S.A.—Petrobras, Rio de Janeiro (BR); Universidade Federal De Minas Gerais—UFMG, Belo Horizonte (BR)

( * ) Notice: Subject to any disclaimer, the term of this patent is extended or adjusted under 35 U.S.C. 154(b) by 444 days.

(21) Appl. No.: 17/994,686

(22) Filed: Nov. 28, 2022

(65) Prior Publication Data
US 2023/0166215 A1    Jun. 1, 2023

(30) Foreign Application Priority Data

Nov. 27, 2021 (BR) ...................... 10 2021 023979 4

(51) Int. Cl.
*B01D 61/02* (2006.01)
*B01D 67/00* (2006.01)
(Continued)

(52) U.S. Cl.
CPC ....... *B01D 61/026* (2022.08); *B01D 67/0002* (2013.01); *B01D 67/00931* (2022.08);
(Continued)

(58) Field of Classification Search
None
See application file for complete search history.

(56) References Cited

U.S. PATENT DOCUMENTS 10,456,754 B2   10/2019   Hogen-esch et al.
2017/0361284 A1  12/2017  Lee et al.

OTHER PUBLICATIONS

Shao et al, "Graphene oxide modified polyamide reverse osmosis membranes with enhanced chlorine resistance," Journal of Membrane Science 525 (2017) 9-17 (Year: 2017).*
(Continued)

*Primary Examiner* — Krishnan S Menon
(74) *Attorney, Agent, or Firm* — Morrison & Foerster LLP

(57) ABSTRACT

The present invention refers to a surface coating of commercial polyamide (PA) membranes with graphene oxide (GO) using a technology that involves spin-coating with specific sequence of low and high rotation, interface phenomena provided by a set of materials containing ethyl alcohol in high concentration, as well as morphological characteristics and customized surface chemistry of GO, among other conditions that allow a differentiated technology to obtain an effective coating of GO on PA membrane.

5 Claims, 6 Drawing Sheets

(51) Int. Cl.
  *B01D 71/56* (2006.01)
  *B82Y 30/00* (2011.01)
  *B82Y 40/00* (2011.01)
  *C02F 1/26* (2023.01)
  *C02F 103/08* (2006.01)

(52) U.S. Cl.
  CPC .............. *B01D 71/56* (2013.01); *B82Y 30/00* (2013.01); *B82Y 40/00* (2013.01); *C02F 1/265* (2013.01); *B01D 2323/21819* (2022.08); *C02F 2103/08* (2013.01)

(56) References Cited

OTHER PUBLICATIONS

Ashfaq et al. (Sep. 2020) "Functionalization Of Reverse Osmosis Membrane With Graphene Oxide To Reduce Both Membrane Scaling And Biofouling", Carbon, 166:374-387.

Choi et al. (Nov. 2013) "Layer-by-Layer Assembly of Graphene Oxide Nanosheets on Polyamide Membranes for Durable Reverse-Osmosis Applications", ACS Applied Materials & Interfaces, 5(23):12510-12519.

Inurria et al. (Feb. 1, 2019) "Polyamide Thin-film Nanocomposite Membranes With Graphene Oxide Nanosheets: Balancing Membrane Performance And Fouling Propensity", Desalination, 451:139-147.

Mahdavi et al. (May 2018) "Zwitterion Functionalized Graphene Oxide/polyamide Thin Film Nanocomposite Membrane: Towards Improved Anti-fouling Performance For Reverse Osmosis", Desalination, 433:94-107.

Shao et al. (Dec. 2016) "Graphene Oxide Modified Polyamide Reverse Osmosis Membranes with Enhanced Chlorine Resistance", Journal of Membrane Science, 525:9-17.

Shao et al. (Dec. 2017) "Layer-by-layer Self-assembly TiO2 And Graphene Oxide On Polyamide Reverse Osmosis Membranes With Improved Membrane Durability", Desalination, 423:21-29.

* cited by examiner

PROCESS FOR OBTAINING POLYAMIDE MEMBRANE WITH NANOSTRUCTURED COATING, MEMBRANES AND USE

CROSS-REFERENCE TO RELATED APPLICATION

This application claims priority to Brazilian Application No. 10 2021 023979 4, filed on Nov. 27, 2021, and entitled "PROCESS FOR OBTAINING POLYAMIDE MEMBRANE WITH NANOSTRUCTURED COATING, MEMBRANES AND USE," the disclosure of which is incorporated herein by reference in its entirety.

FIELD OF INVENTION

The present invention refers to a nanostructured coating process on polyamide (PA) membranes applied in the area of water and effluent treatment to increase the hydraulic permeability compared to reverse osmosis membranes, and enable operation at low pressures and in the presence of free chlorine, thus minimizing the formation of biofilm, energy expenditure and inorganic fouling, consequently increasing the performance of the process and the lifetime of the membranes, with a reduction in operational expenses.

DESCRIPTION OF THE STATE OF THE ART

Processes for treating water and effluents have different levels of complexity, from the removal of suspended solids to desalination, and their selection depends on the required quality of the effluent and the intended destination.

The operation of treatment systems based on membranes requires the dosing of chemical products to minimize problems of fouling (antifouling) and biofilm formation (diacids). The coating of these membranes with nanomaterials has the potential to reduce this chemicals consumption and reduce energy consumption by allowing operation at lower pressures. Additionally, the operation of the current systems coexists with the risk of the membrane burning due to failures in the downstream chlorine removal system.

Thus, there is a demand for steps and equipment that allow greater technical-economic efficiency and the technical solutions with the use of nanomaterials are promising for this. The current membranes used worldwide for the treatment of water and effluents present the following operational difficulties/limitations: a) high energy consumption due to the high pressures required for operation; and b) incompatibility of materials with the presence of free chlorine and, consequently, high consumption of chemical products to control the formation of biofilms.

Within this context, the nanostructured coating of these membranes presents the following potential benefits: a) increased permeate flux; b) lower energy costs (low pressure); c) lower costs with chemical products; d) minor fouling problems; e) less tendency to form biofilms: operation in the presence of residual chlorine and diacid action of nanocomposites; f) adaptability to existing systems. It should also be noted that these nanostructured membranes have the potential to be used by both Refining and E&P units.

The literature presents several studies on polyamide with materials related to graphene, such as MAHDAVI, H.; RAHIMI, A. (2018) "Zwitterion functionalized graphene oxide/polyamide thin film nanocomposite membrane: Towards improved anti-fouling performance for reverse osmosis", Desalination, v. 433, p. 94-107, who added a predetermined amount of graphene oxide (GO) together with water and m-phenylenediamine (MPD) and then produced polyamide membranes by interfacial polymerization methodology.

INURRIA, A. et al. (2019) "Polyamide thin-film nanocomposite membranes with graphene oxide nanosheets: Balancing membrane performance and fouling propensity", Desalination, v. 451, p. 139-147, incorporated GO into the organic phase of interfacial polymerization to manufacture polyamide (PA) membranes containing the nanomaterial.

These works use nanomaterials in polyamide precursors for subsequent membrane synthesis. Therefore, nanomaterials are additives to the integral polyamide composition and there is no use of GO as a coating.

SHAO, F. et al. (2017) "Layer-by-layer self-assembly $TiO_2$ and graphene oxide on polyamide reverse osmosis membranes with improved membrane durability" Desalination, v. 423, p. 21-29, produced PA membranes with nanoparticles of titanium dioxide ($TiO_2$) and GO, by dispersing the nanomaterials in water at concentrations of 0.005 g/L, via sonication for 1 h, and subsequent application to the membranes by dip-coating. The process of dip coating was based on immersing the membranes in $TiO_2$ dispersion for 1 h, washing with water, drying to room temperature, immersion in the GO dispersion for 1 h, washing with water and drying. These steps were repeated for deposition of different layers of $TiO_2$ and GO.

CHOI, W. et al. (2013) "Layer-by-layer assembly of graphene oxide nanosheets on polyamide membranes for durable reverse-osmosis applications", ACS Applied Materials and Interfaces, v. 5, p. 12510-12519, studied the effect of the GO layer on improving membrane durability. The GO multilayers were formed on the surface of the membranes by the layer-by-layer method through the deposition of GO nanosheets with opposite charges, also via the dip-coating technique. PA membranes were immersed for 10 minutes in an aqueous suspension of GO functionalized with amine group at a concentration of 1% by mass and then washed with distilled water. Subsequently, the membranes were immersed in a 1% by mass GO aqueous suspension for another 10 minutes, followed by washing with distilled water. The process was repeated in varying numbers, until reaching 10 bilayers of aminated GO and GO. The membranes were dried at 70° C. for 10 minutes at the end.

These processes comprise the integral immersion of the membranes in dispersions of nanomaterials, as well as successive washing and drying steps.

SHAO, F. et al. (2017) "Graphene oxide modified polyamide reverse osmosis membranes with enhanced chlorine resistance", Journal of Membrane Science, v. 525, p. 9-17, used GO in aqueous dispersions or containing at least 30% water in a concentration of 0.075 g/L, which were applied via spin-coating under heating to 60° C. and constant rotation of 600 rpm, with membrane drying to room temperature before applying further layers of nanomaterials.

These processes were based on materials containing water, with heating during the process and drying of the membranes.

In this context, the State of the Art comprises processes for obtaining PA membranes with GO by introducing the nanomaterial in the synthesis of PA, by immersing membranes in GO dispersions, by applying aqueous dispersions of GO or containing a proportion of water, the latter usually with a drying step. There are no reported technologies that promote specific interface phenomena for the effective deposition of GO on polyamide membranes, combined with highly efficient and fast processes.

Document U.S. Ser. No. 10/456,754B2 refers to the incorporation of graphene oxide (GO) in the membrane polymer matrix, the polymers being formed by a blend of polyvinylidene fluoride (PVDF) and poly(styrene sulfonic acid-(PSSA)-co-styrene-co-methyl styrene), using the so called interfacial polymerization technique, which process is entirely based on the incorporation of GO into the polymeric matrix, and the superficial coating of GO on the membrane are distinct techniques that affect and change considerably both the nanomaterial bonds in the membrane (such as covalent bonds and hydrogen interactions) and methods of separating contaminants (such as molecular size and electrostatic repulsion). Also, there is no mention of chlorine resistance. Chlorine resistance is related to better chemical stability in terms of permeability and salt rejection when there is exposure to this substance, therefore it is a differentiated characteristic in relation to organic or inorganic fouling agents Document US20170361284A1 discloses a surface modification of the reverse osmosis membrane by coating it with glycerin and polyvinyl alcohol (PVA), with the aim of providing a membrane with a dry treatment process to increase resistance against displacement of the selective layer and moisture content after drying. This document covers the manufacture of the polysulfone porous support membrane, followed by interfacial polymerization to design the selective layer, and finally, the coating with glycerin and PVA. However, there is no report that the coating results in an increment in the membrane properties during operation compared to reference membranes, and there is no discussion of improvements in terms of chlorine resistance.

The article by ASHFAQ, M. Y. et al. (2020) "Functionalization of reverse osmosis membrane with graphene oxide to reduce both membrane scaling and biofouling", Carbon, v. 166, p. 374-387, describes surface functionalization of commercial PA-based reverse osmosis membrane. To guarantee the interaction between this new surface and the nanomaterial, the carboxyl groups of GO were functionalized with amine groups. Thus, two functionalization processes were carried out involving different inputs for surface modification, one in the commercial reverse osmosis membrane and the other in GO. In addition, after the first stage of membrane functionalization, its surface was exposed to the functionalized GO solution for 1 hour so that the interaction between the two parts could occur. Soon after, the membrane was washed twice and sonicated in a bath for two minutes to ensure the removal of GO that did not react with the membrane surface. However, the present invention does not provide surface functionalization of the commercial membrane, nor functionalization of the oxygenated groups of graphene oxide with amine or any other type of functional group. In contrast, such article obtained a permeability decrease by functionalization with GO-amine.

Upon studying the above-mentioned documents and other State of the Art reports, it really seems that the integration of GO in membranes is an interesting alternative to increase performance in water treatment applications. However, the area of membrane separation processes is very broad, which includes a very wide range of different membrane materials, their production processes, types of GO and ways of integrating membranes with GO.

The developed technology differs from methods aimed at the use of GO as an additive to the polymeric matrix of membranes, functionalization with GO and coatings applied by other approaches. The invention comprises a surface coating of commercial PA membranes with GO using a technology developed especially for this purpose, which involves spin-coating with specific sequence of low and high rotation, interface phenomena provided by a set of materials containing ethyl alcohol in high concentration, as well as morphological and surface chemistry characteristics customized of GO, among other conditions that allow a differentiated technology to obtain an effective and homogeneous coating of GO on PA membrane. There is a synergistic set provided by the characteristics of the GO, the interface phenomena and the application process that provide a high level of nanometric coating, high distribution of nanosheets and adequate adhesion of the GO to the PA.

Therefore, the present invention was developed to solve such problems providing a process for obtaining a polyamide (PA) membrane with graphene oxide (GO), with the objective of coating the membrane surface with GO, via technology developed especially for this purpose, in which it provides gains in hydraulic permeability and greater chemical stability linked to resistance to chlorine due to GO's performance as a coating, minimizing the formation of biofilm, energy expenditure and inorganic fouling, consequently increasing process performance and membrane lifetime, with reduced operating expenses, such as lower consumption of chemical products, reduced energy consumption and improved technical and economic attractiveness of reusing industrial effluents.

Furthermore, the present invention provides a membrane that uses the hardware of reverse osmosis plants already installed in the refineries, minimizing implementation costs.

BRIEF DESCRIPTION OF THE INVENTION

The present invention deals with a nanostructured coating process on polyamide membranes for treating water and effluents for industrial use, which includes spin-coating with specific sequence of low and high rotation, interface phenomena provided by a set of materials containing ethyl alcohol in high concentration, as well as morphological characteristics and customized surface chemistry of GO.

The interfacial interactions between GO, ethyl alcohol and PA, without the presence of moisture in considerable quantities, take place to enable an interface phenomenon between GO and PA that provides an efficient deposition of the nanomaterial through a spin-coating specific sequence of low rotation followed by high rotation to promote effective spreading and adhesion of the GO. The necessary interactions to promote the proper spreading of the nanosheets and the nanomaterial transfer present in the solvent to the surface layer of PA via spin-coating are dependent on a GO with a degree of oxidation above 35% by mass.

The present invention can be applied in reverse osmosis systems existing in the Refining units, in which it is estimated that these units produce a flow of about 3,400 m3/h of demineralized water. And for application in E&P units for desulfation (URS) with an estimated flow of 32,000 m3/h.

BRIEF DESCRIPTION OF DRAWINGS

The present invention will be described in more detail below, with reference to the attached figures which, in a schematic and not limiting of the inventive scope, represent examples of its realization. In the drawings, there are.

DETAILED DESCRIPTION OF THE INVENTION

Figure 1:
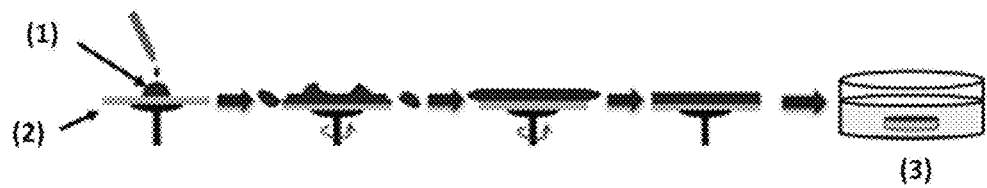
FIG. 1 illustrating a coating scheme via spin-coating with subsequent membrane immersion in water, where (1) represents dispersion of GO in ethanol, (2) BW30 membrane and (3) deionized water.

The present invention presents a synergistic effect between graphene oxide (GO), ethyl alcohol and polyamide (PA) membranes that guarantees a high level of nanometric coating, high distribution of nanosheets and adequate adhesion of the GO to PA. The invention is related to the use of ethyl alcohol in high concentration (absolute ethyl alcohol, 99.5%) without the use of water, to allow an interface phenomenon between the GO and the PA that provides an efficient deposition of the nanomaterial. The technology involves GO with a degree of oxidation above 35% by mass, higher than that typically used in the State of the Art, to guarantee its stable dispersion in ethyl alcohol, as well as an interaction at a sufficient level with PA and allowing a suitable deposition, without removing the nanomaterial together with the solvent after its application.

The GO nanosheets used must present a distribution of up to 10 layers, to allow an efficient deposition and not generate a barrier to transport in the membranes, and an average lateral dimension greater than 1 micrometer, to allow a satisfactory level of coverage according to the developed technology. The process is based on the surface application of GO/ethyl alcohol through the spin-coating, with a step at low rotation to promote suitable spreading of the nanosheets and adhesion of the GO by centrifugal force, followed by a step at high rotation to remove excess solvent and ensure the transfer of the nanomaterial present in the solvent to the layer surface area of PA by the generated interactions.

GO/ethyl alcohol dispersion is used in concentrations of 0.1 to 2.0 g/L, to allow the level of coating required in this process, with the necessary contact to form the GO coating on the surface of the polymeric material, and without exceeding a value that compromises the nanometric deposition of GO due to excess material and viscosity incompatibility with the related application. The application includes a proportion between 10 and 30 ml of dispersion of GO in ethyl alcohol per $cm^2$ of membrane, which allows spreading compatible with the developed process. The deposition involves from 1 to 5 application layers, by repeating the same established procedures.

The process of the present invention does not employ any prolonged drying at room temperature or by heating, due to the fast and effective deposition provided by the application method and by the interface phenomena of GO/ethyl alcohol and PA.

Therefore, the process involves a low amount of GO, a fast application time and an efficient deposition of the nanomaterial through the development of a specific and synergistic set of multiple variables related to the chemical characteristics of the materials, the interfaces involved and the application process.

Briefly, the present invention comprises the following process steps:
(a) Prepare dispersion of GO in absolute ethyl alcohol (99.5%) between 0.1 g/L and 2 g/L in which GO presents a degree of oxidation greater than 35% by mass, layer distribution of up to 10 nanosheets and an average lateral dimension greater than 1 micrometer;
(b) Apply the dispersion obtained in (a) on reverse osmosis membranes constituted by a selective layer of PA, using the spin-coating technique, with a step of low rotation followed by high rotation, in which the application includes a proportion between 10 and 30 ml of dispersion of GO in ethyl alcohol per $m^2$ of PA membrane. The low-speed stage in spin-coater occurs between 500 and 1000 rpm and the high rotation stage is between 1600 and 2400 rpm;
(c) Repeat step (b) between 1 and 5 times; and
(d) Immerse the membranes in water immediately after step (c).

PA membranes with GO obtained by the process of the present invention comprises graphene oxide on the surface of the polyamide, with a degree of oxidation greater than 35% by mass, layer distribution up to 10 nanosheets and average lateral dimension greater than 1 micrometer, with membrane permeability greater than 3.5 L/h·m2·bar, saline rejection greater than 96%, and preservation of oxygenated groups and groups related to polyamide after exposure to 1000 ppm/h of chlorine. Such PA membranes with GO obtained are applied for use in the desalination of river/spring water or process water for reuse.

EXAMPLES

The invention is based on the nanostructured coating of commercial polyamide (PA) membranes, using the BW30 reverse osmosis membrane (Dow FilmTec®) in the following examples. The present invention can be better understood by means of the following examples, which are not limiting, and which can be complemented to better detail the scope of the technology and the descriptive sufficiency.

Example 1: Production of Nanostructured Membranes and Evaluation of Permeability and Saline Rejection Three concentrations of GO in ethyl alcohol were used, as follows: 0.1; 0.5 and 1 g/L of GO. Absolute ethyl alcohol was used, with a solvent concentration of 98.5%. The membrane coating was carried out using the Spincoater Laurrell 650MZ-23NPPB equipment. The spin-coating is a process that consists of spreading a liquid film by centrifugal force on a rotating substrate (FIG. 1).

15 ml of the GO dispersion in ethyl alcohol were poured onto the membrane under agitation at 600 rpm for 30 seconds, causing the GO to adhere to the membrane by centrifugal force, and then at agitation at 2000 rpm for 30 seconds. Then, the membranes were immediately immersed in deionized water for characterization regarding the hydraulic permeability, saline rejection, atomic force microscopy (AFM), scanning electron microscopy (SEM), Fourier-transform infrared spectroscopy (FTIR) and contact angle.

Figure 2:
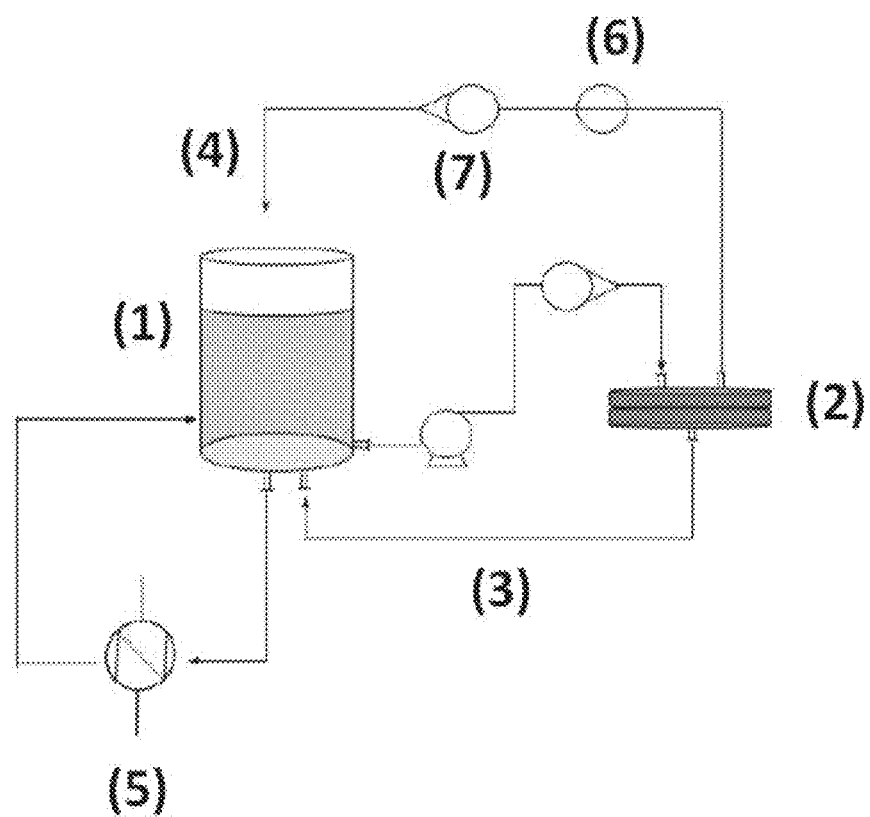
FIG. 2 illustrating a schematic diagram of the reverse osmosis membrane permeability test, where (1) represents feed tank, (2) RO membrane cell, (3) permeate stream, (4) concentrate stream, (5) cooling system with thermometer, (6) manometer and (7) rotameter.

With regard to permeability, the membranes were compacted at 12 bar with subsequent evaluation of the flow in three pressure conditions (12, 10 and 8 bar) to obtain the pressure versus flow curve. Permeability consists the angular coefficient of the linear fit obtained. The temperature was maintained at around 25° C. using a cooling system. The tests were carried out with deionized water in the feed tank, constant feed flow of 2.4 L/min and recirculation of concentrate and permeate to the feed tank (FIG. 2).

Figure 3:
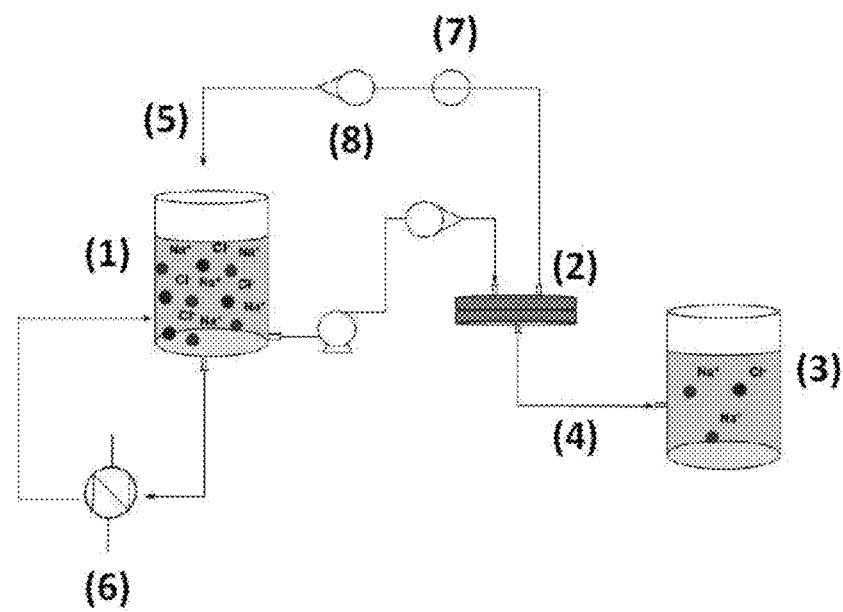
FIG. 3 illustrating a schematic diagram of the reverse osmosis membrane salt rejection test where (1) represents feed tank, (2) RO membrane cell, (3) permeate tank, (4) permeate stream, (5) concentrate stream, (6) cooling system with thermometer, (7) manometer and (8) rotameter.

Salt rejection tests were conducted on the same benchtop filtration unit in which hydraulic permeability was determined. The tests were carded out using a solution of 2.0 g/L of sodium chloride (NaCl), pressure of 12 bar, maintaining the temperature around 25° C. with the aid of a cooling system, and recovery rate of 15%. The unit was maintained with a feed flow rate of 2.4 L/min, with recirculation only of the concentrate to the feed tank and continuous collection of the permeate (FIG. 3). The electrical conductivity (µS/cm) of the feed and permeate were measured and converted into NaCl concentration (mg/L). Then, the rejection was calculated according to Equation 1, wherein Ci is the initial concentration, Cf is the final concentration and R (%) corresponds to the obtained rejection. After the saline rejection tests, the membranes were washed and immersed in deionized water.

$$R\ (\%) = \left(\frac{C_i - C_f}{C_i}\right) \times 100 \quad (1)$$

Figure 4:
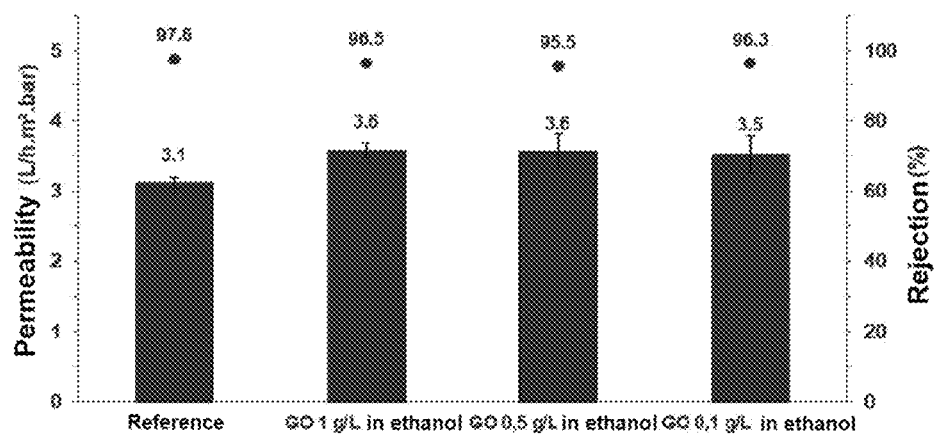
FIG. 4 illustrating a graph of permeability and rejection of BW30 membranes coated with spin-coating with GO in ethyl alcohol at different concentrations.

As can be seen in FIG. 4, the results of hydraulic permeability and saline rejection, if compared with the reference (without GO coating), show a significant increase in permeability (16% for GO at 1 g/L), with only one negative oscillation in rejection (≈2%). Furthermore, it is observed that the variation in the concentration of GO in ethyl alcohol in this range of values did not promote a considerable change in the results between samples with nanomaterials. However, it is important to point out that in addition to the permeability and rejection results, it is also important to evaluate the membrane resistance to chlorine.

Example 2: Resistance to Chlorine in Nanostructured Membranes

The chlorine resistance of the nanostructured membranes was evaluated by comparing the characterizations before and after chlorine attack, for membranes produced with GO in ethyl alcohol with a concentration of 1.0 g/L.

Chlorine resistance tests were carried out using sodium hypochlorite (NaClO). To evaluate the time of chlorine exposure on the membrane, two strategies were investigated: short exposure (100 ppm of NaClO for 10 hours) and long exposure (1 ppm of NaClO for 21 days). It is noteworthy that the long exposure test refers to half the time of the total ratio of 1000 ppm/h of the first strategy. Chlorine resistance was measured by comparing the results of permeability and saline rejection before and after chlorine attack.

Figure 5A:
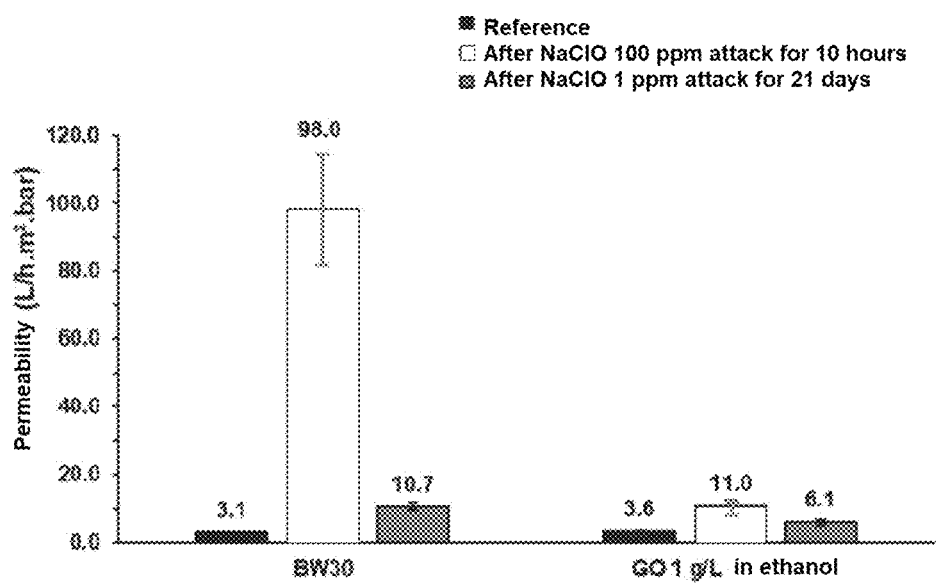
FIG. 5A illustrating a graph of permeability of BW30 membranes coated with spin-coating with GO in 1 g/L ethyl alcohol after chlorine attack by short exposure (NaClO 100 ppm, 10 hours) and long exposure (NaClO 1 ppm 21 days)
Figure 5B:
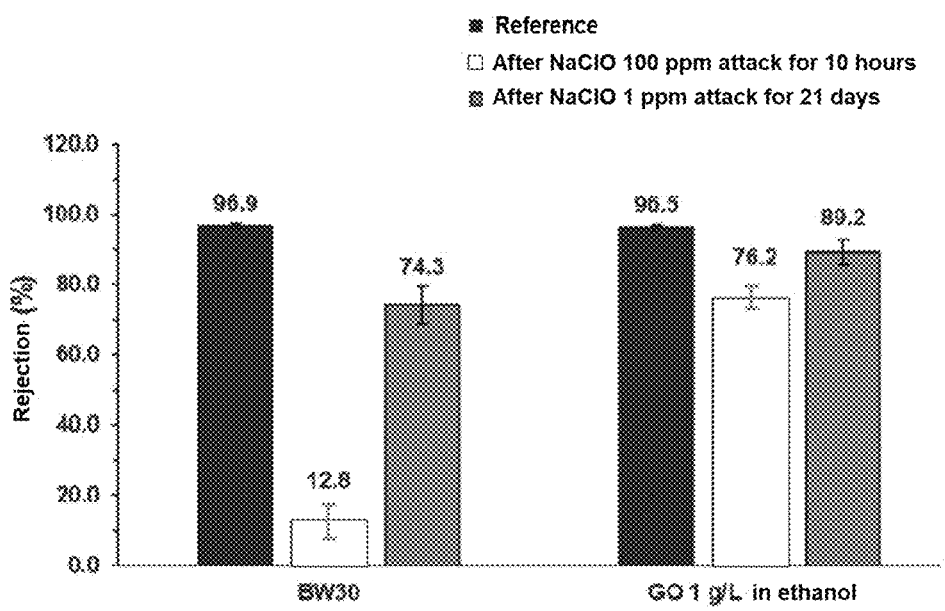
FIG. 5B illustrating a graph of rejection of BW30 membranes coated with spin-coating with GO in 1 g/L ethyl alcohol after chlorine attack by short exposure (NaClO 100 ppm, 10 hours) and long exposure (NaClO 1 ppm 21 days)

According to FIG. 5A, BW30 after short exposure and long exposure had its permeability increased by about 3060 and 245%, respectively. As for the membrane coated with GO in ethyl alcohol, the permeability of the membrane after short exposure and long exposure increased by about 205 and 70%, respectively. With regard to rejection (FIG. 5B), an 87% decrease in BW30 was observed after short exposure and 23% after long exposure. The nanostructured coating promoted a decrease of 21 and 8% in rejection after short and long exposure, respectively. The permeability and rejection results before and after chlorine attack show that GO performed as a chlorine protection barrier to the PA layer of the membrane, avoiding replacement of the hydrogen in the amide N—H bond by chlorine (N—Cl bond). Another point to consider is the time of exposure and the concentration of NaClO on the membrane, since it was observed that the use of higher concentrations of NaClO (100 ppm) promoted a proportionally more harmful effect to the membrane than the NaClO concentration at 1 ppm, but with better PA preservation in both cases due to the protection provided by the GO coating. This set of positive results in terms of permeability and resistance to chlorine was not observed for systems containing water, used for comparison purposes.

Example 3: Characterizations by AFM, SEM FTIR and Contact Angle

Membranes were also characterized by SEM, FTIR and contact angle (wetting) before and after exposure to chlorine. FIGS. 6A-6D and Table 01 show the three-dimensional topography maps and the results obtained from the arithmetic mean roughness (Ra) obtained by AFM, of the BW30 surfaces and membranes coated with GO in ethyl alcohol before and after short exposure.

TABLE 01

5 µm × 5 µm AFM topography results for BW30 and GO membranes in 1 g/L ethyl alcohol before and after short exposure chlorine attack (100 ppm NaClO, 10 hours).

| Membranes | Mean roughness ± standard deviation (n = 3) | |
|---|---|---|
| | : | After short exposure |
| BW30 | 42 ± 2 | 6 ± 4 |
| GO in ethyl alcohol 1 g/L | 26 ± 6 | 25 ± 3 |

Figures 6A, 6B:
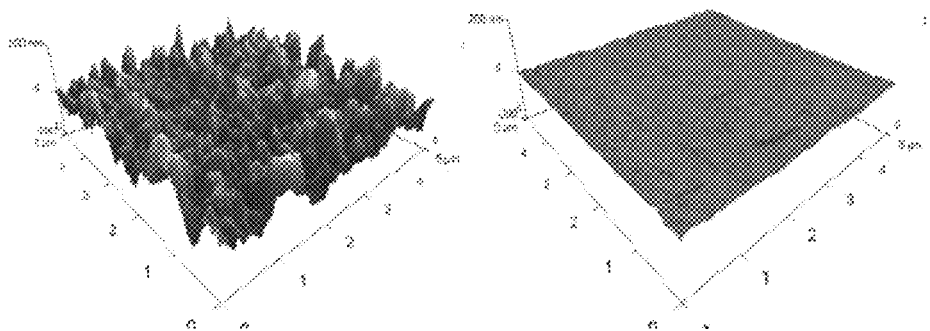
FIG. 6A illustrating a 5 µm×5 µm AFM topography image for a BW30 membrane.
FIG. 6B illustrating a 5 µm×5 µm AFM topography image for BW30 membrane after short exposure.
Figures 6C, 6D:
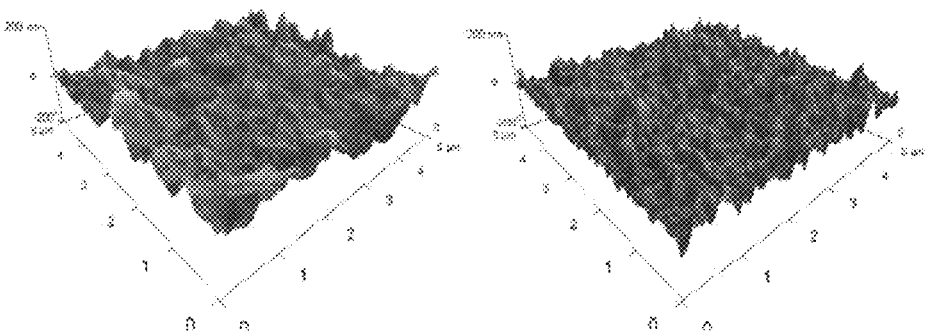
FIG. 6C illustrating a 5 µm×5 µm AFM topography image a BW30 membrane coated with spin-coating with GO in ethyl alcohol 1 g/L.
FIG. 6D illustrating a 5 µm×5 µm AFM topography image for a BW30 membrane coated with spin-coating with GO in ethyl alcohol 1 g/L after short exposure.

The destruction of the PA layer after chlorine attack can be confirmed by FIG. 6B, in which an expressive loss of roughness (86%) can be observed. With regard to the membrane covered with GO in ethyl alcohol, the average roughness was maintained, which confirms the above justification presented in relation to GO acting as a protection barrier to PA. However, it is important to point out that even with the maintenance of the average roughness in the membrane after exposure to chlorine, possibly there was a reaction of NaClO with PA since there was an increase in permeability and a decrease in saline rejection (FIG. 5).

Figures 7A, 7B:
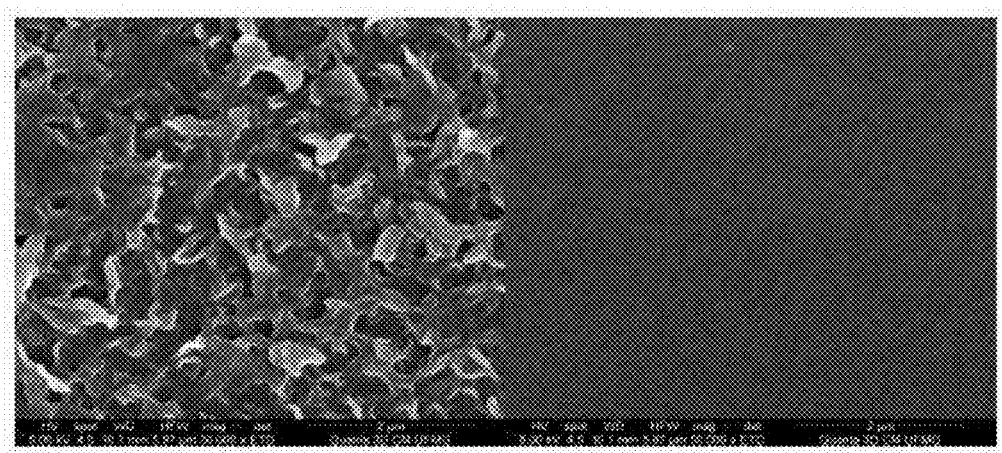
FIG. 7A illustrating a SEM topography image for a BW30 membrane.
FIG. 7B illustrating a SEM topography image for a BW30 membrane after short exposure.
Figures 7C, 7D:
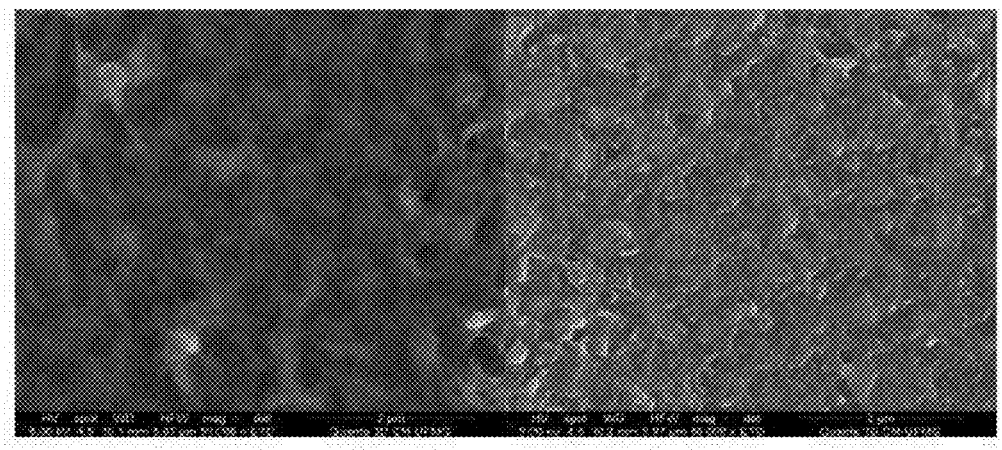
FIG. 7C illustrating a SEM topography image a BW30 membrane coated with spin-coating with GO in ethyl alcohol 1 g/L.
FIG. 7D illustrating a SEM topography image a BW30 membrane coated with spin-coating with GO in ethyl alcohol 1 g/L after short exposure.

The SEM images also emphasize that there was a destruction of the PA layer due to the loss of the characteristic morphology, evidenced by the presence of peaks and valleys, the BW30 (FIG. 7B). The SEM image for the membrane with GO deposition in ethyl alcohol 1.0 g/L highlights the presence of a homogeneous and uniform coating over the entire surface of the membrane (FIG. 7C), which may be a justification for the low decay of saline rejection after chlorine attack. Furthermore, even without the presence of GO after short exposure the membrane showed similar morphology to BW30, without PA destruction (FIG. 7D).

The short exposition of BW30 to chlorine provided the loss of characteristic chemical groups of PA as 0-H stretching (3500 cm-1), stretching N—H (3250 cm-1), amide C=O bond stretching (1660 cm-1) and amide N—H bond folding (1542 cm-1). The coating with GO in ethyl alcohol promoted the intensification of the 0-H band, due to the presence of oxygenated groups in the deposited GO. It is observed both the maintenance of the 0-H groups and the characteristic bands of amide groups after exposure to chlorine of the membrane covered with GO in ethyl alcohol, justifying the better preservation of the permeability and rejection results when compared to the BW30 without coating.

Figure 8:
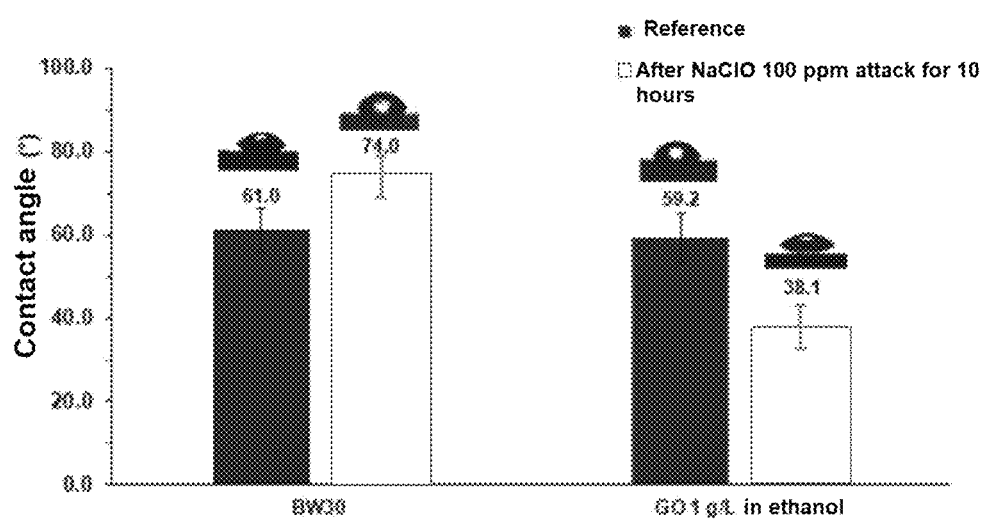
FIG. 8 illustrating a contact angle graph for BW30 and GO membranes in reference ethyl alcohol and after short exposure (NaClO 100 ppm, 10 hours).

Considering the results obtained by contact angle, it is noted that there was an increase in hydrophobicity after the attack of chlorine on the BW30 membrane (FIG. 8). In contrast, this trend was not observed for the membrane coated with GO in ethyl alcohol, as there was a decrease in hydrophobicity after short exposure to chlorine. More experimental tests are underway to explore this inverse trend of BW30 and nanostructured membranes, focusing on the interaction mechanisms between PA, GO and NaClO.

It should be noted that, although the present invention has been described in relation to the attached drawings, it may undergo modifications and adaptations by technicians versed in the subject, depending on the specific situation, but provided that it is within the inventive scope defined herein.

The invention claimed is:

1. A process for obtaining polyamide membrane with nanostructured coating, the process comprising the following steps:
    (a) prepare dispersion of graphene oxide (GO) in absolute ethyl alcohol (99.5%) between 0.1 g/L and 2 g/L;
    (b) apply the dispersion obtained in step (a) on reverse osmosis membranes made of a selective polyamide (PA) layer, using spin coating technique, with low rotation stage followed by high rotation;
    (c) repeat step (b) between 1 and 5 times; and
    (d) immerse the membranes in water immediately after step (c).

2. The process according to claim 1, wherein in the step (a) the GO presents a degree of oxidation greater than 35% by mass, layer distribution of up to 10 nanosheets and an average lateral dimension greater than 1 micrometer.

3. The process, according to claim 1, wherein in the step (b) the application includes a ratio of between 10 and 30 ml of GO dispersion in ethyl alcohol per cm2 of PA membrane.

4. The process, according to claim 1, wherein in step (b), the low rotation step in spin-coat is between 500 and 1000 rpm and the high rotation step is between 1600 and 2400 rpm.

5. The process, according to claim 1, wherein after step (d) the membranes have properties of a permeability greater than 3.5 L/h·m2·bar, saline rejection greater than 96%, and preservation of oxygenates groups and groups related to polyamide after exposure to 1000 ppm/h of chlorine.

* * * * *